United States Patent
Woodham

(10) Patent No.: US 6,779,648 B2
(45) Date of Patent: Aug. 24, 2004

(54) 360 DEGREE ROTATABLE LIFTER ARM FOR LOG SINGULATOR

(75) Inventor: Van Woodham, Theodore, AL (US)

(73) Assignee: PSI Sales, Inc., Theodore, AL (US)

(*) Notice: Subject to any disclaimer, the term of this patent is extended or adjusted under 35 U.S.C. 154(b) by 0 days.

(21) Appl. No.: 09/904,397

(22) Filed: Jul. 12, 2001

(65) Prior Publication Data

US 2002/0046924 A1 Apr. 25, 2002

Related U.S. Application Data

(60) Provisional application No. 60/217,845, filed on Jul. 13, 2000.

(51) Int. Cl.[7] ............... B65G 29/00; B65G 37/00; B65G 47/04; B65G 47/46; B65G 25/00
(52) U.S. Cl. ............... 198/463.1; 198/463.5; 198/608
(58) Field of Search ............... 198/443, 463.5, 198/465.6, 774.1, 774.2, 777, 608; 414/746.2; 221/237

(56) References Cited

U.S. PATENT DOCUMENTS

| | | | |
|---|---|---|---|
| 2,993,606 A | * | 7/1961 | Helstrom ............... 198/443 |
| 3,157,071 A | * | 11/1964 | Pachell ............... 198/608 |
| 4,245,735 A | | 1/1981 | Valo |
| 4,501,643 A | | 2/1985 | Kiuru |
| 4,624,361 A | | 11/1986 | Hollins |
| 4,852,716 A | | 8/1989 | Roche |
| 4,911,283 A | | 3/1990 | Hollins |
| 4,930,616 A | | 6/1990 | Lindberg |
| 5,011,024 A | | 4/1991 | Bunney |
| 5,062,523 A | * | 11/1991 | Lenz ............... 198/463.4 |
| 5,174,351 A | | 12/1992 | Lindenblatt et al. |
| 5,217,106 A | * | 6/1993 | Bunney ............... 198/463.5 |
| 5,423,417 A | * | 6/1995 | Redekop ............... 198/774.1 |
| 6,386,823 B1 | * | 5/2002 | Perreault ............... 198/608 |

FOREIGN PATENT DOCUMENTS

CA 2299479 1/2001

* cited by examiner

Primary Examiner—Gene O. Crawford
(74) Attorney, Agent, or Firm—Alston & Bird LLP

(57) ABSTRACT

A device for singulating individual logs from groups of logs for linear or transverse processing. The log singulator having a fully rotatable lifter arm member, i.e., 360 degrees rotatable, which is used to singulate logs from groups of logs. The rotatable axle of the lifter arm may be located above the upstream "V" of the log cradle member. Furthermore, the lifter arm will positively push the logs over the top point of the log cradle because it is rounded at the top point, thereby allowing the tip of lifter arm to remain in contact with the log. Lifter arms with 1 to 4 lifter arm tips are disclosed.

11 Claims, 5 Drawing Sheets

360 DEGREE ROTATABLE LIFTER ARM FOR LOG SINGULATOR

This application claims benefit of Provisional Application Serial No. 60/217,845 filed on Jul. 13, 2000.

BACKGROUND OF THE INVENTION

1. Field of the Invention

The present invention relates generally to log singulators, and more particularly, is concerned with a log singulator having a 360-degree rotatable lifting arm.

2. Description of the Prior Art

Log singulators have been described in the prior art. However, none of the prior art devices disclose the unique features of the present invention.

In U.S. Pat. No. 5,423,417, dated Jun. 13, 1995, Redekop disclosed a log singulator for sorting, feeding and indexing in a downstream direction a stack of logs into a stream of logs which has a first notched step and a first set of collectively actuable lift arms pivotable about a first axis, and a second set of collectively actuable lift arms downstream of the first set of lift arms, actuable independently of the first set of collectively actuable lift arms and pivotable about a second axis, the first set of lift arms actuable from a lowered position to a raised position whereby the first set of lift arms are engageable with a log at a first engagement point thereby to raise the log from the stack of logs, the first axis downstream of the first engagement point relative to the direction of movement of said logs in said stream of logs, the first axis generally below the first notched step, the first notched step adapted to receive and hold the stack of logs, the first set of lift arms in the raised position positioning the log so as to deposit the log into a second notched step below the first set of lift arms in the raised position and downstream of the first notched step, the second set of lift arms actuable from a lowered position to a raised position whereby the second set of lift arms are engageable with the log in the second notched step at a second engagement point thereby to raise the log from the second notched step, the second axis downstream of the second engagement point and generally below the second notched step, the second set of lift arms in the raised position positioning the log so as to deposit the log from the log singulator.

In U.S. Pat. No. 5,174,351, dated Dec. 29, 1992, Lindenblatt, et al., disclosed an ending apparatus for positioning elongate objects comprising, in combination, object singulating equipment for separating a plurality of elongate objects in an inlet area into single objects while moving the objects in a first direction to an outlet area, and object support rollers intermediate the inlet and outlet area for supporting a separated, single elongate object. The object support rollers are adapted to move the elongate object in a second direction toward a reference surface independently of the object's movement in the first direction on the singulating device. The reference surface stops movement of the elongate object to establish a predetermined position for the elongate object. Establishing the position of the object permits more efficient handling during further processing.

In U.S. Pat. No. 4,585,114, dated Apr. 29, 1986, Liliano disclosed an apparatus for the transfer of mandrels from a lube conveyer to a parallel mandrel pre-insertion line which comprises a plurality of transfer devices each of which has an arm for the direct transfer of the mandrels which is disappearingly movable transversely between the said conveyor and the said line, and a further pair of arms, one fixed and one movable, having upper saw-tooth profiles cooperating to effect a stepwise displacement of the mandrels between the conveyor and the said line.

While these log singulators may be suitable for the purposes for which they were designed, they would not be as suitable for the purposes of the present invention, as hereinafter described.

SUMMARY OF THE INVENTION

The present invention discloses a device for singulating individual logs from groups of logs for linear or transverse processing. The present invention discloses a log singulator having a fully rotatable lifter arm member, i.e., 360 degrees rotatable, which is used to singulate logs from groups of logs. The rotatable axle of the lifter arm may be located above the upstream "V" of the log cradle member. Furthermore, the lifter arm of the present invention will positively push the logs over the top point of the log cradle because it is rounded at the top point, thereby allowing the tip of lifter arm to remain in contact with the log. Lifter arms with 1 to 4 lifter arm tips are disclosed.

In log utilization facilities, the need exists to singulate individual logs from groups of logs for linear or transverse processing. Several types of devices have been developed to accomplish this task. The devices currently available utilize a method of lifting logs over fixed generally V-shaped log cradles via a reciprocating motion generated by mechanical components. This particular motion has several disadvantages: the return motion of the lifting mechanism utilizes time in which the forward flow of logs being singulated is stopped; the reciprocating motion requires a bulky, complicated mechanism to perform the forward and backward motion; as logs are lifted over the top of the V-shaped log cradle, movement of the log to complete the motion to the bottom of the upstream V-shaped pocket is dependent on gravity; logs with knots or that are crooked may not slide into proper position; the reciprocating lifting device is of an eccentric design, meaning that its weight is not balanced, and, this off center weight disadvantage utilizes approximately 25% of the total power to move a log from stage to stage; the V-shaped log cradles surfaces may be covered with smooth steel plating, and, the plating makes crooked or knotty logs "stand off" from the bottom of the V log cradle, and, if the logs are too far away from the lift position of the pocket, they will not be transferred from stage to stage.

Objects and advantages of the present invention are to disclose a singulation device which does not reciprocate, but makes a full 360-degree motion. The rotary motion device of the present invention has several advantages. Since the rotary singulation motion is continuous, in a constant direction, there is no lost time waiting or the lifting device to return to start position and, therefore, productivity of the rotary device is greatly improved over the reciprocating device. The drive unit for the rotary motion is direct connected to the lift mechanism, eliminating the need for a complicated mechanical means, e.g., a transmission, to develop the reciprocating motion. Because the motion is continuous, the shape of the rotating lift arm is designed so that the log is positively guided into the bottom of the upstream V-shaped log cradle which eliminates the possibility of knots or crooked logs hanging on the pocket surfaces. The rotary lifting device is of a concentric design, meaning that its weight is substantially totally balanced. Due to it being balanced, a power savings of up to 25% per stage can be realized to lift the same size log as a reciprocating design. In the rotary design, an open skid concept is utilized, meaning that the V-shaped log cradles are not covered with steel plating. However, alternatively, the skids may be plated over. The open design allows crooked or knotty logs to lay in the open V-shaped log cradle, conforming to the shape of the log. This permits the log to be lifted into the proper position so that logs can be more efficiently transferred from stage to stage of the log singulator.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
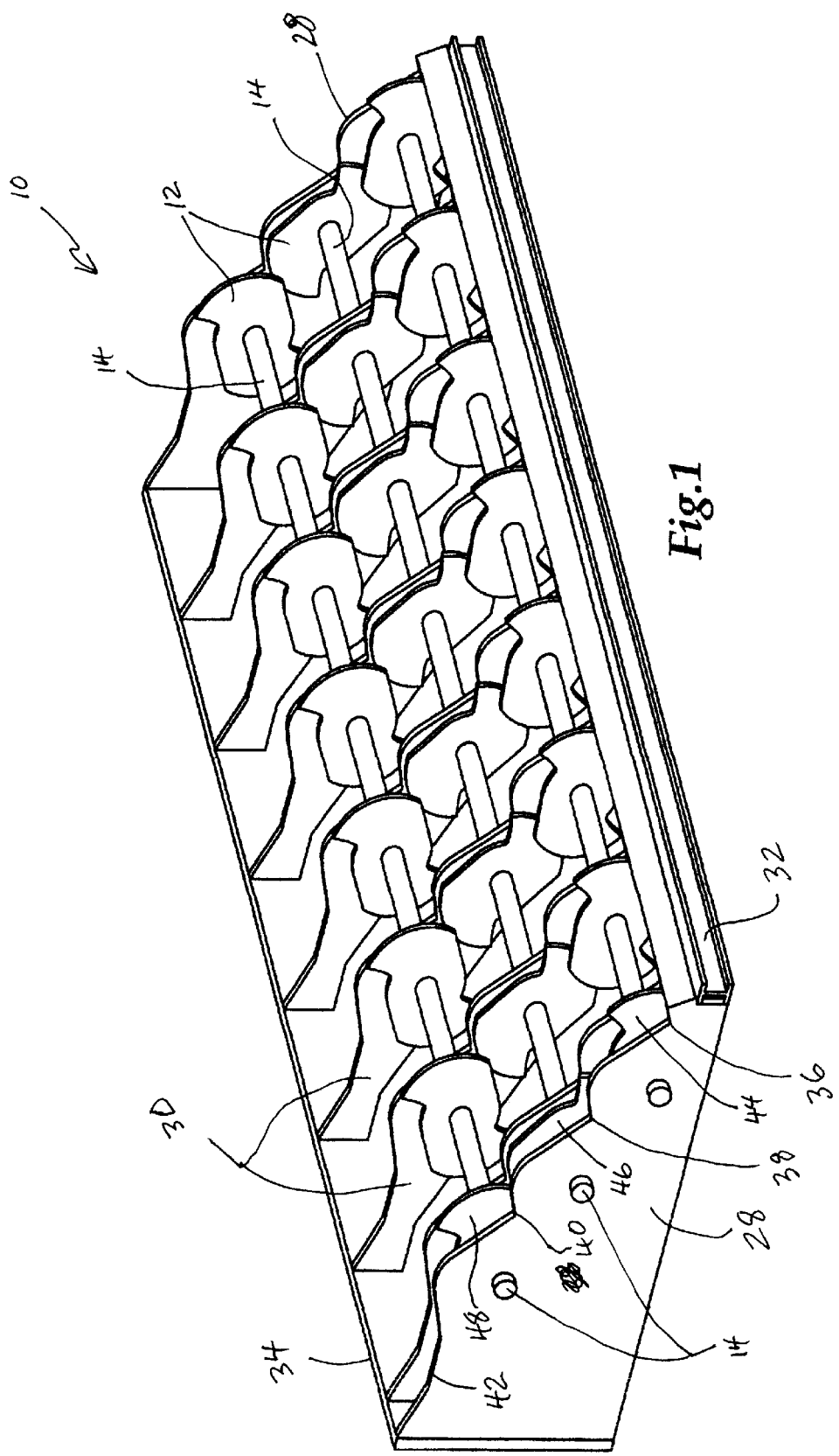
FIG. 1 is a perspective view of the present invention.

With regard to reference numerals used, the following numbering is used throughout the drawings.

10 log singulator
12 lifter arm
14 axle
16 center line of axle
18 "V" bottom
20 log cradle
22 log
24 top point
26 tip of lifter arm
28 sidewall
30 support members
32 front cross member
34 rear cross member
36 log cradle
38 log cradle
40 log cradle
42 log cradle
44 lifter arm
46 lifter arm
48 lifter arm
50 lifter arm face

DESCRIPTION OF THE PREFERRED EMBODIMENT(S)

Turning now descriptively to the drawings, in which similar reference characters denote similar elements throughout the several views, FIGS. 1 through 7 illustrate the present invention wherein a 360 degree rotatable lifter arm for use on a log singulator is disclosed.

Turning to FIG. 1, therein is shown a perspective view of a log singulator 10 having multiple lifter arms 12 installed thereon. Multiple axles are provided 14 upon which the lifter arms 12 rotate which axle extends through and serves multiple lifter arms 12. The log singulator comprises a pair of sidewalls 28 and a plurality of vertically standing support members 30 held upright by a cross member 32 on the first, front, lower end of the log singulator 10 and a second, back, cross member 34 on the rear or upper end of the log singulator 10. Axles 14 are journalled through sidewalls 28 and support members 30 and equipped with bearing means as would be done by one skilled in the art. Furthermore, means for rotating the multiple axles 14 in a counterclockwise and/or clockwise direction would also be provided. It should be seen that the log singulator 10 operates by moving logs in a stepwise fashion up the log singulator by first moving a log from log cradle 36 to the next higher log cradle 38 and then up to the next higher log cradle 40 and then up onto the highest log singulator station 42 where the log would then be moved by other machinery for further proceeding. The first set of lifter arms 44 move the log from log cradle 36 downstream to log cradle 38 where a second set of lifter arms 46 contact the logs to move them downstream to log cradle 40 where a third set of lifter arms 48 move the logs downstream to log cradle station 42.

Figure 2:
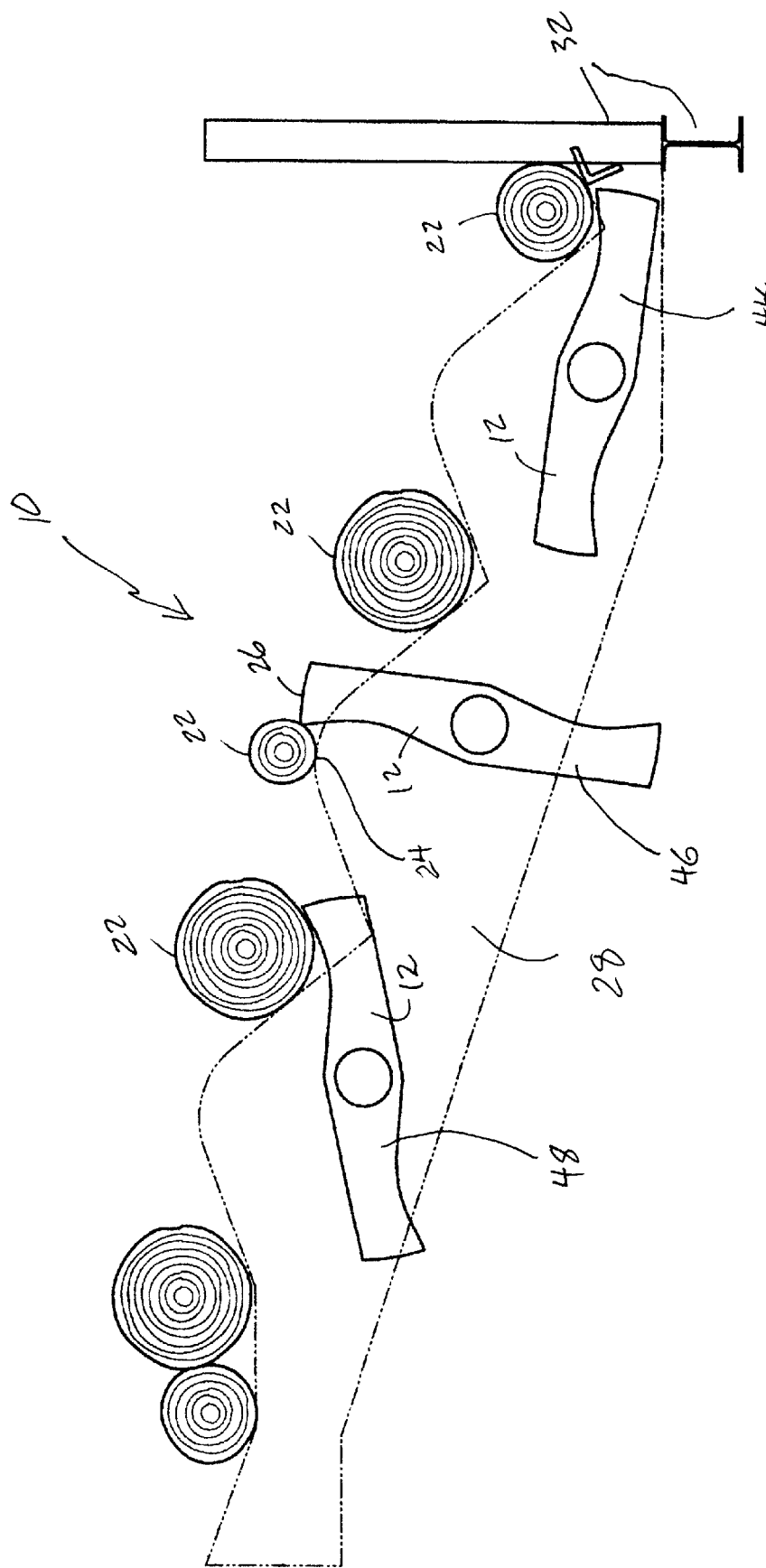
FIG. 2 is a side elevation view of parts of the present invention.

Turning to FIG. 2, therein is shown a side view of the present invention 10 showing a left sidewall 28 along with a first lifter arm 44, a second lifter arm 46, and a third lifter arm 48, all shown in relationship to logs 22. It can be seen here that the lifter arms 12 rotate 360 degrees. It should also be noted that as shown with lifter arm 46 that the tip of the lifter arm 26 is slightly longer than the top point 24 of the log cradle so that the lifter arm 46 will positively push the log 22 over the top point 24 of the log cradle because the log cradle is rounded at the top point 24, thereby allowing the tip 26 of arm 46 to remain in contact with logs 22 in order to positively push the logs 22 to the next higher or downstream log cradle. Front cross member 32 is also shown.

Figure 3:
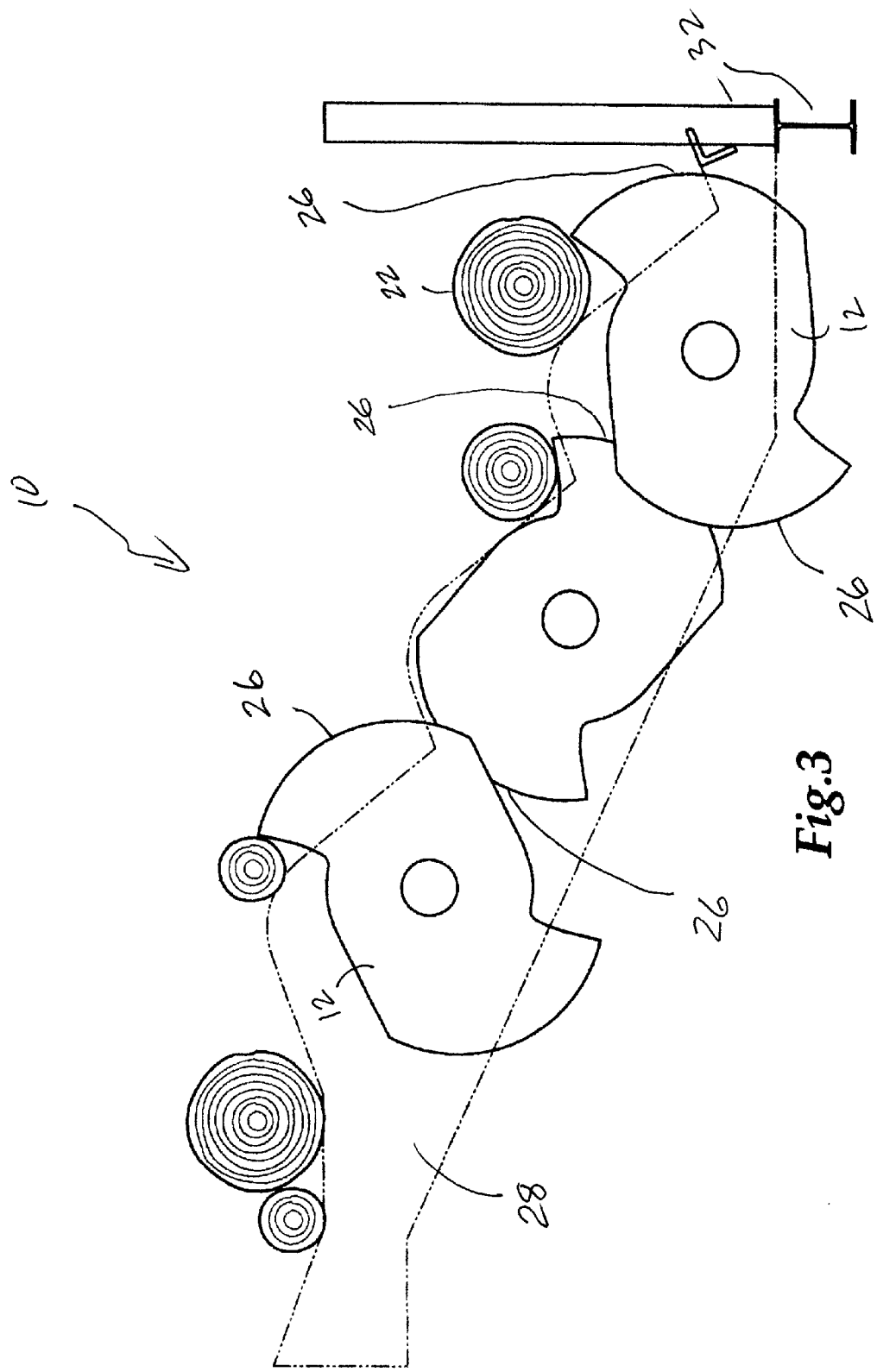
FIG. 3 is a side elevation view of parts of the present invention.

Turning to FIG. 3, therein is shown a side elevation view of another lifter arm embodiment of the present invention 10. Shown therein is the lifter arms 12 having a different design wherein the lifter arm tips 26 overlap each other requiring that the lifter arms be disposed off-center from each other in order to move logs downstream or up the log singulator in order to allow tips 26 to clear each other.

Figure 4:
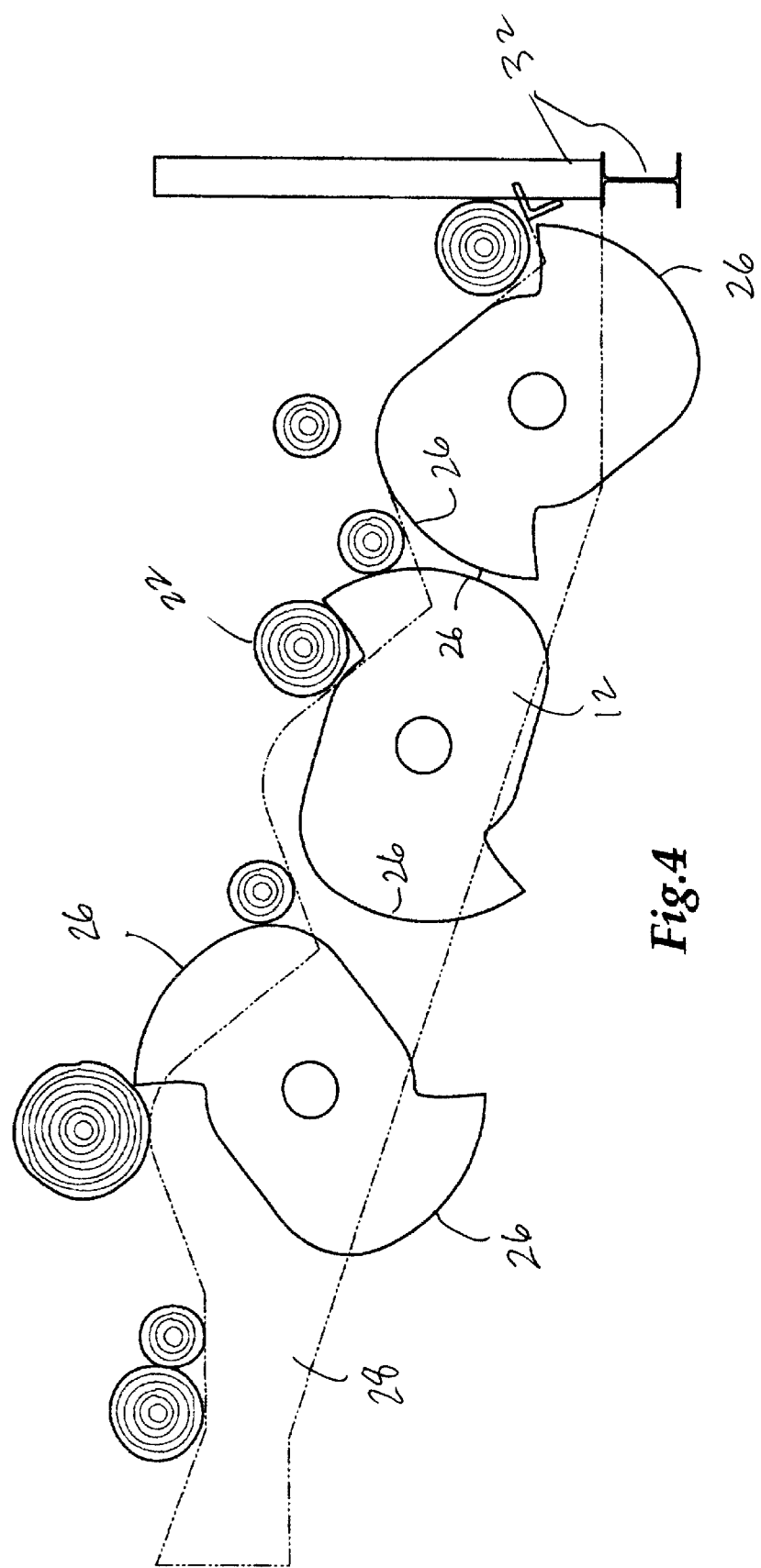
FIG. 4 is a side elevation view of parts of the present invention.

Turning to FIG. 4, therein is shown a side elevation view of another lifter arm embodiment of the invention shown in FIG. 3 wherein the lifter arms 12 are shown spaced apart so that the tips 26 thereof do not overlap; therefore, allowing the tips 26 of the lifter arms 12 to clear each other without being disposed off-center from each other.

Figure 5:
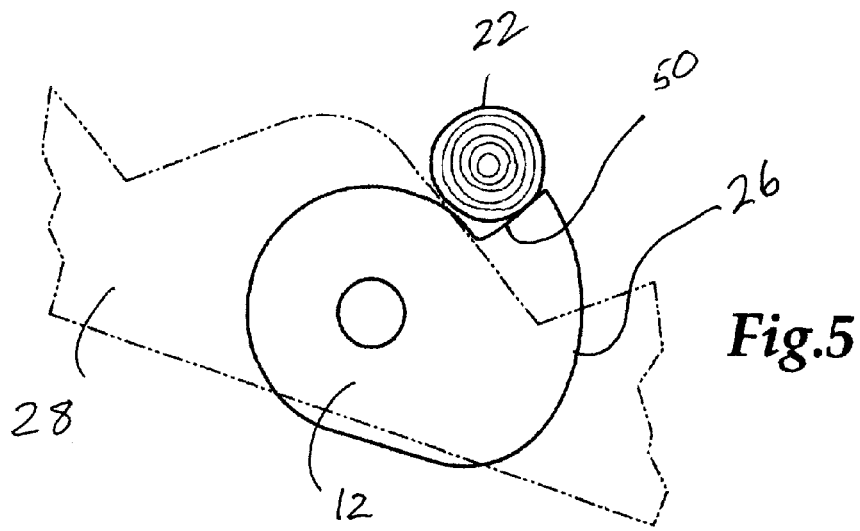
FIG. 5 is a side elevation view of parts of the present invention.

Turning to FIG. 5, therein is shown a side elevation view of another lifter arm embodiment of the present invention wherein the lifter arms 12 have only one tip 26 having only one face with which to contact logs 52.

Figure 6:
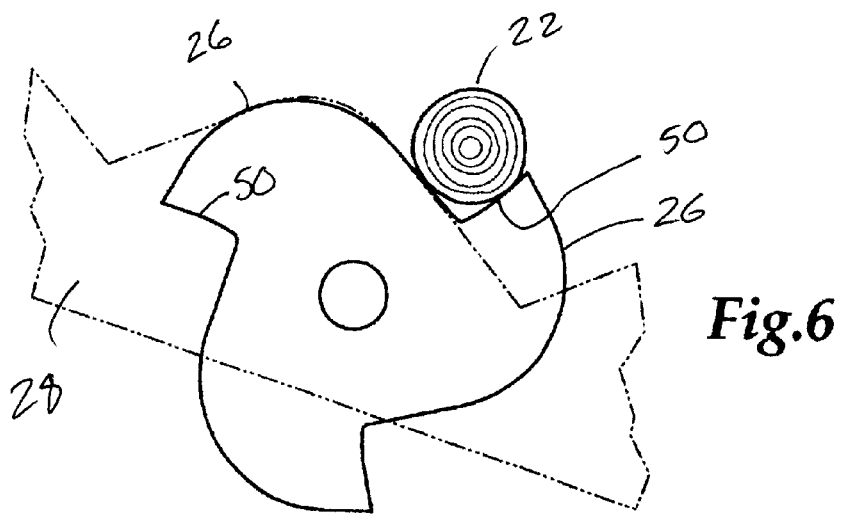
FIG. 6 is a side elevation view of parts of the present invention.

Turning to FIG. 6, therein is shown a side elevation view of another lifter arm embodiment of the present invention wherein the lifter arms 12 have three tips 26 having three faces 50 with which to contact logs 22.

Figure 7:
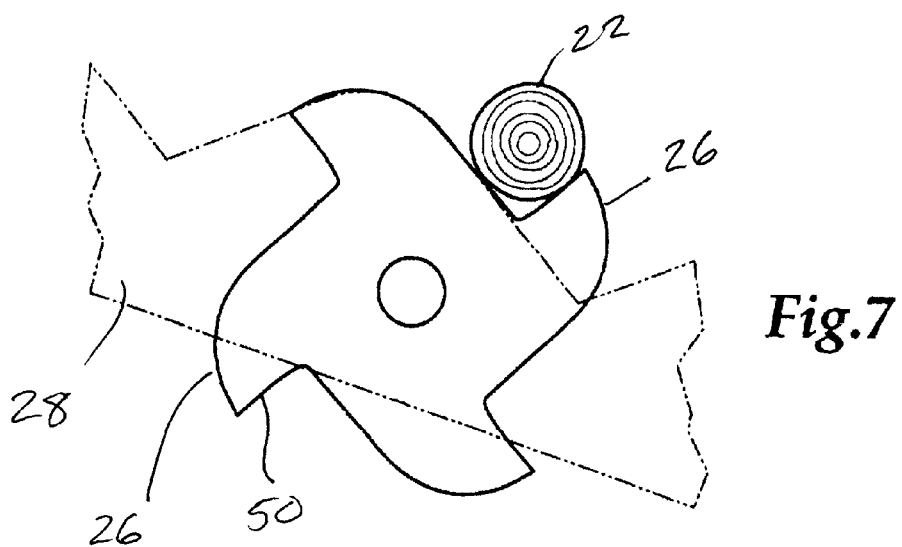
FIG. 7 is a side elevation view of parts of the present invention.

Turning to FIG. 7, therein is shown a side elevation view of another lifter arm embodiment of the present invention wherein the lifter arms 12 have four tips 26 having four faces 50 with which to contact logs 22.

Many specific details contained in the above description merely illustrate some preferred embodiments and should not be construed as a limitation on the scope of the invention. Many other variations are possible.

What is claimed to be new and desired to be protected by letters patent is set forth in the appended claims.

I claim:

1. A machine for conveying and singulating logs, comprising:
   a frame having a front end and a rear end, and a pair of opposite sides formed by a pair of spaced, generally parallel side walls;
   stationary members supported in the frame and defining upper log-bearing surfaces, the log-bearing surfaces being arranged along an inclined conveying path that extends from the front end toward the rear end of the frame along which logs are conveyed;
   a plurality of generally horizontal shafts rotatably mounted between the side walls, the shafts being generally parallel to one another and spaced apart along the conveying path;
   lift arms mounted on each shaft for rotation therewith; and
   a drive system for rotatably driving the shafts so as to rotate the sets of lift arms 360 degrees about axes of the shafts, the lift arms of each of the shafts along the conveying path engaging a log on a lower location of the log-bearing surfaces and lifting the log over a top point to a higher location on the log-bearing surfaces at which the log is engaged by the lift arms of a next one of the shafts along the conveying path, the log thus being lifted over the top points and conveyed along the conveying path to the rear end of the frame, wherein at least one of the top points is defined by one or more surfaces that define a generally smooth contour over which the logs can be moved.

2. The machine of claim 1, wherein the log-bearing surfaces extend continuously along the conveying path from the front end to the rear end.

3. The machine of claim 2, wherein the log-bearing surfaces define a series of steps along the conveying path.

4. The machine of claim 1, wherein each shaft has a plurality of lift arms spaced apart at different axial locations along the shaft.

5. The machine of claim 4, wherein at each axial location along each shaft there are a plurality of lift arms spaced circumferentially from each other.

6. The machine of claim 1, wherein the stationary members defining the log-bearing surfaces comprise support plates oriented vertically and generally parallel to the side walls and located between the side walls.

7. The machine of claim 6, wherein the support plates extend continuously from proximate the front end to proximate the rear end of the frame.

8. The machine of claim 7, wherein the shafts extend through apertures defined in the support plates.

9. A machine for conveying and singulating logs, comprising:
   a frame having a front end and a rear end, and a pair of opposite sides formed by a pair of spaced, generally parallel side walls;
   stationary members supported in the frame and defining upper log-bearing surfaces, the log-bearing surfaces being arranged along a conveying path that extends from the front end toward the rear end of the frame along which logs are conveyed, the log-bearing surfaces defining a series of alternating valleys and crests spaced along the conveying path, the valleys comprising log cradles, a top point of each crest being higher than the log cradles immediately upstream and downstream of said crest;
   a plurality of generally horizontal shafts rotatably mounted between the side walls, the shafts being generally parallel to one another and spaced apart along the conveying path, wherein each shaft is located generally beneath the crest between immediately upstream and downstream log cradles;
   lift arms mounted on each shaft for rotation therewith; and
   a drive system for rotatably driving the shafts so as to rotate the lift arms 360 degrees about axes of the shafts;
   wherein the lift arms on each shaft are configured and positioned in relation to the log-bearing surfaces so that the lift arms engage a log in the upstream log cradle and lift the log along the log-bearing surfaces and so that a tip of each lift arm extends above the top point of the crest such that the lift arms positively push the log over the crest into the downstream log cradle, said lift arms further being configured with front and back surfaces that are generally parallel, further rotation of the lift arms causing the tips of the lift arms to dip down below the log-bearing surfaces at a point between the crest and the downstream log cradle so that the logs are free to move down one of the log-bearing surfaces defining an upstream side of the downstream cradle and be stopped by one of the log-bearing surfaces defining a downstream side of the downstream cradle without engaging the back surface of an arm of a downstream shaft.

10. The machine of claim 9, wherein the conveying path is inclined such that logs are progressively lifted higher from each log cradle to the next.

11. The machine of claim 9, wherein each lift arm has a plurality of tips circumferentially spaced apart about the respective shaft.

\* \* \* \* \*